(12) United States Patent
Ramineni et al.

(10) Patent No.: US 11,271,925 B1
(45) Date of Patent: Mar. 8, 2022

(54) SECURE ACCESS GATEWAY FOR EGRESS SYSTEM

(71) Applicant: Workday, Inc., Pleasanton, CA (US)

(72) Inventors: Kala Krishna Ramineni, San Ramon, CA (US); Justin Pratt, San Leandro, CA (US)

(73) Assignee: Workday, Inc., Pleasanton, CA (US)

( * ) Notice: Subject to any disclaimer, the term of this patent is extended or adjusted under 35 U.S.C. 154(b) by 254 days.

(21) Appl. No.: 16/528,604

(22) Filed: Jul. 31, 2019

(51) Int. Cl.
*H04L 29/06* (2006.01)

(52) U.S. Cl.
CPC ........ *H04L 63/083* (2013.01); *H04L 63/0218* (2013.01); *H04L 63/0245* (2013.01); *H04L 63/062* (2013.01); *H04L 63/101* (2013.01); *H04L 63/164* (2013.01)

(58) Field of Classification Search
CPC ............. H04L 63/0245; H04L 63/0218; H04L 63/062; H04L 63/083; H04L 63/101; H04L 63/164
See application file for complete search history.

(56) References Cited

U.S. PATENT DOCUMENTS

| | | | |
|---|---|---|---|
| 9,313,024 B1* | 4/2016 | Stute | H04L 9/08 |
| 10,044,723 B1* | 8/2018 | Fischer | H04L 63/0807 |
| 2002/0049912 A1* | 4/2002 | Honjo | H04L 63/062 726/10 |
| 2018/0075250 A1* | 3/2018 | Chasman | H04L 63/083 |
| 2018/0337784 A1* | 11/2018 | Jain | H04L 9/3213 |
| 2019/0005454 A1* | 1/2019 | Hilckox | G06Q 10/103 |
| 2019/0121963 A1* | 4/2019 | Coleman | G06F 21/53 |
| 2020/0412538 A1* | 12/2020 | Rosado | H04L 9/3247 |

\* cited by examiner

*Primary Examiner* — Kristine L Kincaid
*Assistant Examiner* — Alexander R Lapian
(74) *Attorney, Agent, or Firm* — Van Pelt, Yi & James LLP (57) ABSTRACT

A system for a secure connection includes an interface and a processor. The interface is configured to receive a request from a user of a tenant to enable a connection for a specific internal network application or service to an external network destination. The processor is configured to determine whether the connection is enabled for the specific internal network application or service for the tenant; and in response to determining that the connection is enabled, providing a token required for the connection to the external network destination.

21 Claims, 8 Drawing Sheets

SECURE ACCESS GATEWAY FOR EGRESS SYSTEM

BACKGROUND OF THE INVENTION

A database system comprising a plurality of tenants allows for a wide range of per-tenant functionality. For example, database administrators and programmers can create tenant-specific data fields, data aggregations, reports, applications, interactive processes, etc. For many database tenants, particularly large database tenants comprising large organizations, database customizations are essential for the utility of the database system to the tenant. Some database customizations require a process communication with an external system. For example, a tenant-specific process on the database system communicates with an application programming interface (API) endpoint on a remote server to transmit and/or receive data. External connections enable valuable new possibilities for the database system; however, allowing remote connections from the database system creates a security risk. The security risk can be mitigated to some extent using firewall technology. However, traditional firewall technology is difficult to adapt for a situation with a large number of tenants using a single system, each tenant with their own privacy criteria. This creates a problem wherein the plurality of tenants cannot make secure and effective use of the firewall technology.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for a secure connection comprises an interface configured to receive a request from a user of a tenant to enable a connection for a specific internal network application or service to an external network destination, and a processor configured to determine whether the connection is enabled for the specific internal network application or service for the tenant, and in response to determining that the connection is enabled, provide a token required for the connection to the external network.

A system for a secure connection comprises a multi-tenant database system including a firewall. The system for a secure connection includes an authorization service for determining whether a request to make an external connection is allowed. The authorization service is in communication with other database system services including a database read server, an authorization database, and a cache service. The authorization service receives a request from a user of a tenant to enable a connection for a specific internal network application or service to an external network destination. For example, a user process includes an authorization service client for redirecting a request to enable a connection to the authorization service. The authorization service determines whether the request is validated. For example, the authorization service determines whether the tenant has permission to make an external connection, whether the application or service has permission to make an external connection, whether the connection destination (e.g., a universal resource locator (URL)) is validated on a tenant whitelist, whether the connection destination is blocked on a system blacklist, etc. The authorization service accesses a tenant whitelist from the database read server (e.g., from tenant data on the database system) to determine whether the tenant has indicated that the connection destination is allowed. The authorization service accesses a system blacklist on an authorization database to determine whether a system administrator has indicated that the connection destination is not allowed. In some cases, a tenant whitelist and/or a system blacklist are cached on a cache service in order to speed access to the tenant whitelist and/or the system blacklist and the cache service is checked first before accessing the tenant whitelist on a database read server or a blacklist on an authorization database. In the event the authorization service determines that the request to make the external connection is allowed, the authorization service provides a token to the authorization service client. The token comprises a token required for the connection to the external network. The authorization service client receives the token and provides the request for connection to an authorization service plugin, including the token required for connection to the external network. The authorization service plugin receives the request including the token, verifies the token, and in the event the token is verified, provides an indication to a firewall system to allow the connection. For example, the authorization service plugin provides an indication to the firewall system to reconfigure a set of allowed connections to allow the request from the authorization service. In some embodiments, the token enables access for egressing data by a gateway prior to a firewall of a local network. In some embodiments, all data traffic is required to pass through a gateway that is controlled using tokens (e.g., data is enabled to be passed with a token, data is not enabled to be passed without a token, etc.).

In some embodiments, the tenant is able to indicate that the connection destination is not allowed by adding a connection destination to a tenant blacklist on a database read server and the authorization service accesses the tenant blacklist in addition to checking the system blacklist to determine whether the connection destination is allowed.

In some embodiments, the system administrator is able to indicate that the connection destination is allowed by adding a connection destination to a system whitelist on the authorization database and the authorization service accesses the system whitelist in addition to checking the tenant whitelist to determine whether the connection destination is allowed.

In some embodiments, a tenant and/or a system administrator are able to determine, configure, write, read, and update whitelists and blacklists on the authorization database and/or the database read server.

The system for a secure connection improves the computer system by allowing firewall level security with the flexibility and reconfigurability of a tenant-specific whitelist stored on a database system.

Figure 1:
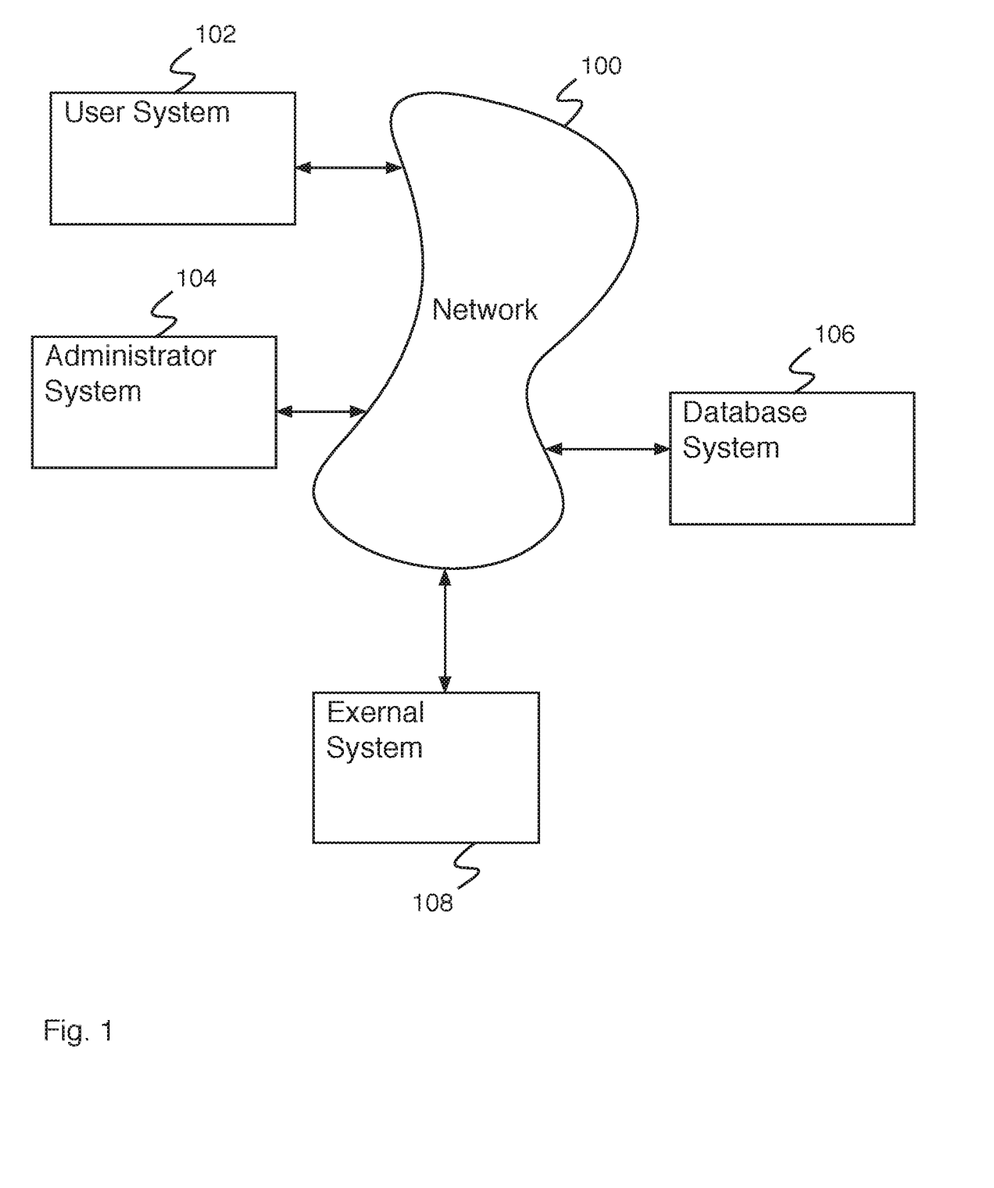
FIG. 1 is a block diagram illustrating an embodiment of a network system.

FIG. 1 is a block diagram illustrating an embodiment of a network system. In some embodiments, the network system of FIG. 1 comprises a network system for a secure connection. In the example shown, FIG. 1 comprises network 100. In various embodiments, network 100 comprises one or more of the following: a local area network, a wide area network, a wired network, a wireless network, the Internet, an intranet, a storage area network, or any other appropriate communication network. User system 102, administrator system 104, database system 106, and external system 108 communicate via network 100. User system 102 comprises a user system for use by a user. For example, user system 102 comprises a desktop computer, a laptop computer, a tablet computer, a smartphone, etc. User system 102 stores and/or accesses data on database system 106. A user uses user system 102 to interact with database system 106—for example, to store database data, to request database data, to create a report based on database data, to create a document, to access a document, to execute a database application, etc. In some embodiments, a user uses a user system to provide data for storage in database system 106. Administrator system 104 comprises an administrator system for use by an administrator. An administrator utilizes administrator system 104 to administrate a network system—for example, installing applications, configuring applications, configuring an operating system, modifying user privileges, etc. Database system 106 comprises a database system for storing data, providing data, executing database applications, preparing reports, storing data associated with multiple tenants, etc. Database system 106 comprises a system for a secure connection. For example, database system 106 comprises an interface configured to receive a request from a user of a tenant to enable a connection for a specific internal network application or service to an external network destination, and a processor configured to determine whether the connection is enabled for the specific internal network application or service for the tenant, and in response to determining that the connection is enabled, provide a token required for the connection to the external network.

Figure 2:
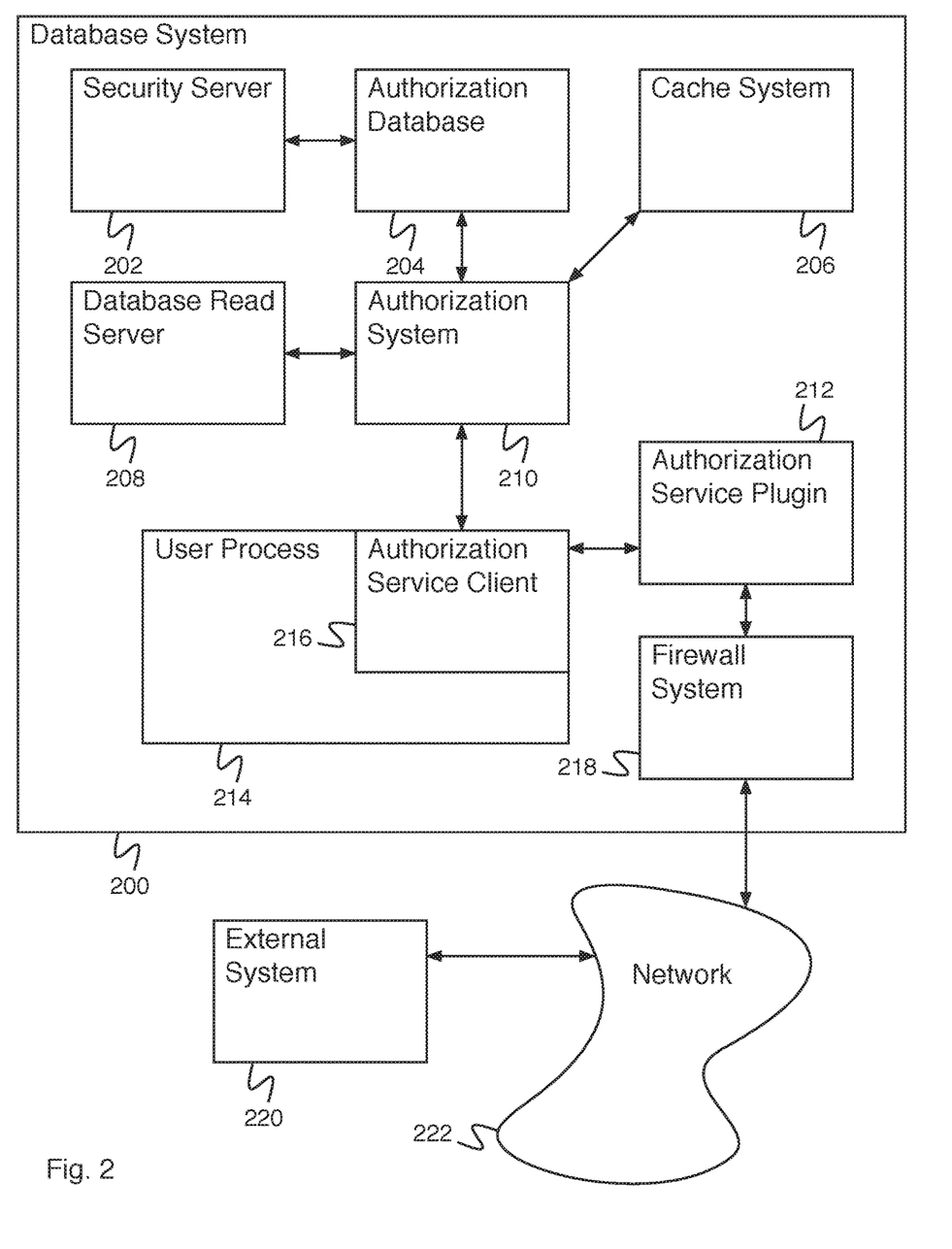
FIG. 2 is a block diagram illustrating an embodiment of a database system.

FIG. 2 is a block diagram illustrating an embodiment of a database system. In some embodiments, database system 200 comprises database system 106 of FIG. 1. In the example show, database system 200 comprises user process 214. For example, user process 214 comprises a process associated with a database system user (e.g., of a set of database system users) for executing user database tasks (e.g., storing user data, retrieving user data, executing user applications or processes, etc.). For example, user process 214 is associated with a user of a tenant of a plurality of tenants. User process 214 comprises authorization service client 216. Authorization service client 216 comprises a client for requesting permission from an authorization system (e.g., authorization system 210) for enabling a connection for a specific internal network application or service to an external network destination. In the event a user requests a connection for a specific internal network application or service to an external network destination, authorization service client 216 receives the request and redirects the request to authorization system 210. Authorization system 210 determines whether the request for the connection is authorized. For example, authorization system 210 comprises an interface configured to receive a request from a user of a tenant to enable a connection for a specific internal network application or service to an external network destination, and a processor configured to determine whether the connection is enabled for the specific internal network application or service for the tenant, and in response to determining that the connection is enabled, provide a token required for the connection to the external network. In some embodiments, authorization system 210 comprises a plurality of processors configured to determine whether the connection is enabled for the specific internal network application or service for the tenant, and in response to determining that the connection is enabled, provide a token required for the connection to the external network. For example, it is determined whether the request for the connection is authorized based at least in part on the user, the tenant associated with the user, the application or service, a whitelist associated with the tenant, or a blacklist associated with the database system. Authorization system 210 requests a whitelist associated with a tenant associated with a connection request from database read server 208. Database read server 208 reads the whitelist from a database region associated with the tenant. The whitelist comprises a set of internet locations, servers, URLs, etc. determined by the tenant to be allowable for connections. Authorization system 210 requests a blacklist from authorization database 204. For example, the blacklist is created by an administrator of database system 200 using security server 202 and stored on authorization database 204 for access by authorization system 210. The blacklist comprises a set of internet locations, servers, URLs, etc. determined by the database system administration to be not allowable for connections. In some embodiments, the blacklist and/or the whitelist are stored on cache system 206 to increase the data availability; authorization system 210 checks for a whitelist and/or a blacklist using cache system 206 prior to checking authorization database 204 and/or database read server 208 for either a whitelist and/or a blacklist in order to speed access to the whitelist and/or the blacklist. In various embodiments, authorization system 210 checks for a tenant whitelist, a tenant blacklist, a system blacklist, and/or a system whitelist or any appropriate combination or permutation of tenant/system whitelist/blacklist to be used in determining whether a connection to an external system is authorized. In the event that authorization system 210 determines that the request for the connection is authorized, authorization system 210 provides a token required for the connection to the external network. In the event that authorization system 210 determines that the request for the connection is not authorized, authorization system 210 refuses to provide the token required for the connection to the external network. In the event authorization service client 216 receives the token, authorization service client 216 provides the request for connection and the token to authorization service plugin 212. Authorization service plugin 212 validates the token, and in the event it is determined that the token is valid, authorization service plugin 212 provides an indication to firewall system 218 to allow the requested connection. The requested connection then passes through firewall system 218 and accesses the desired external system 220 via network 222. In some embodiments, a public key infrastructure is used to ensure internal network security (e.g., communication between the elements of database system 200 is encrypted using a public key infrastructure). For example, each distinct system is associated with a public key and a private key, wherein the public key is publicly known and the private key is known only to the system, and messages to a system are encrypted with the public key of that system for decryption with its private key. In some embodiments, ensuring internal network security comprises enabling only known entities to authorize a token.

Figure 3:
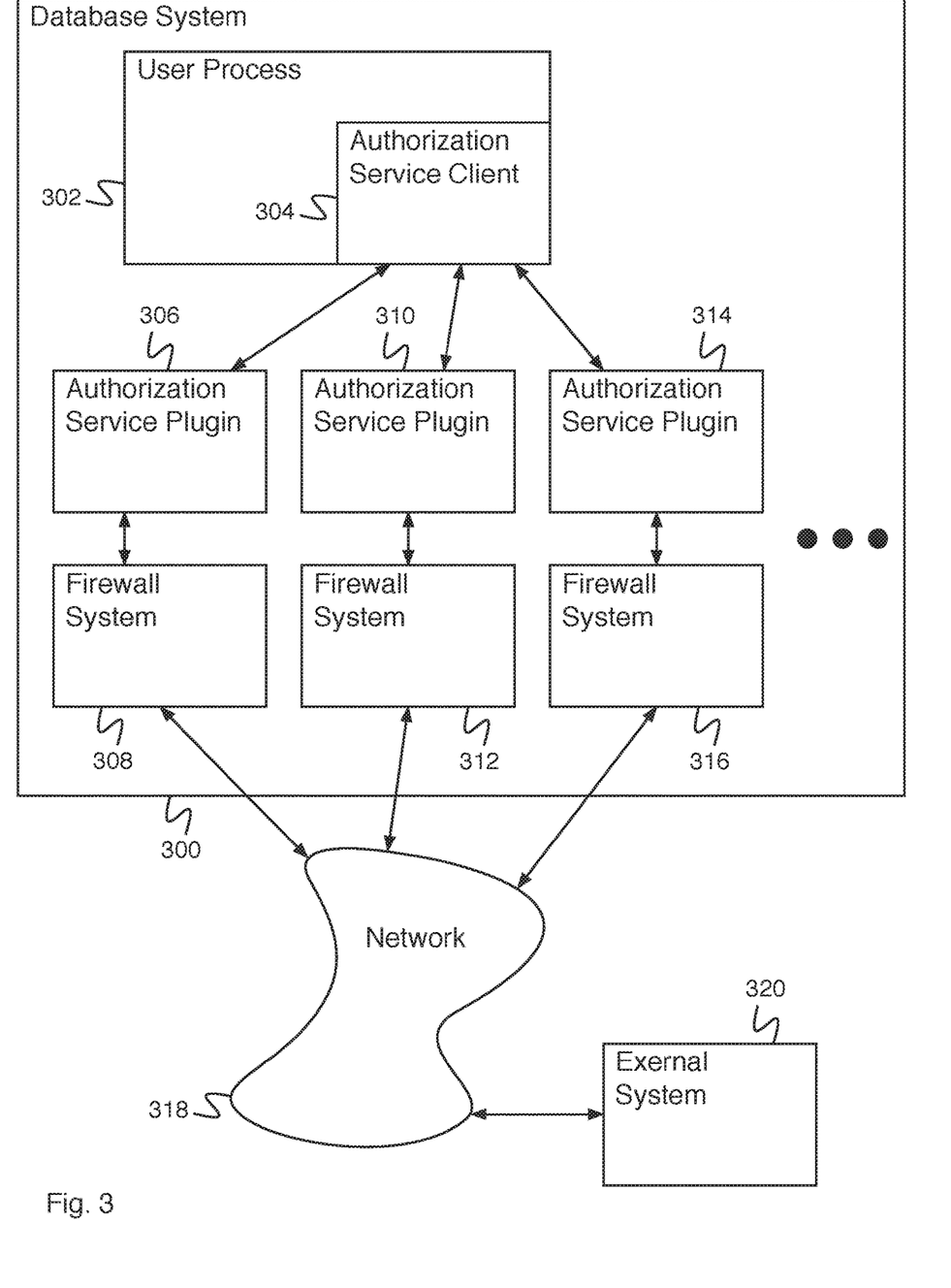
FIG. 3 is a block diagram illustrating an embodiment of a portion of a database system including multiple firewall systems.

FIG. 3 is a block diagram illustrating an embodiment of a portion of a database system including multiple firewall systems. In some embodiments, database system 300 comprises database system 200 of FIG. 2. In the example shown, user process 302 comprises a user process for a user comprising authorization service client 304. In the event authorization service client 304 receives a token required for a connection to an external network (e.g., from an authorization system), authorization service client provides a request for connection and the token to one of authorization service plugin 306, authorization service plugin 310, authorization service 314, or any other appropriate authorization service plugin. For example, an authorization service plugin is determined randomly, using a round robin process, by determining a least recently used authorization service plugin, by determining a least loaded authorization service plugin, by determining an authorization service plugin associated with a least loaded firewall system, etc. Each authorization service plugin of database system 300 is associated with a firewall system, forming a plugin firewall pair (e.g., firewall system 308 between authorization service plugin 306 and network 318, firewall system 312 between authorization service plugin 310 and network 318, and firewall system 316 between authorization service plugin 314 and network 318). For example, each plugin firewall pair is configured to verify data and allow the connection (e.g., in the event the data is verified). When an authorization service plugin receives a request for connection and a token, it validates the token, and in the event it is determined that the token is valid, it provides an indication to its associated firewall system to allow the requested connection. The requested connection then passes through the associated firewall system and accesses the desired external system 320 via network 318.

Figure 4:
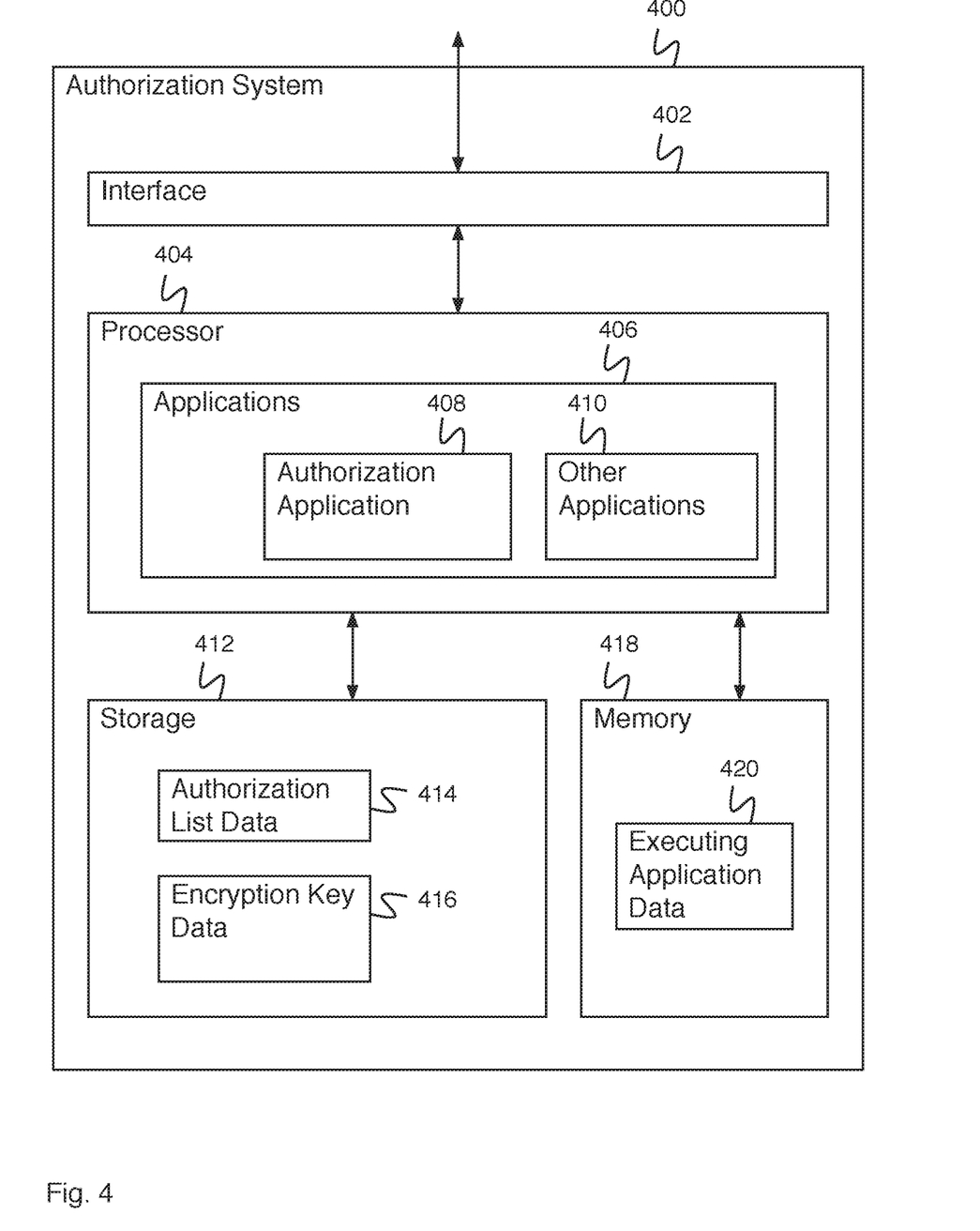
FIG. 4 is a block diagram illustrating an embodiment of an authorization system.

FIG. 4 is a block diagram illustrating an embodiment of an authorization system. In some embodiments, authorization system 400 of FIG. 4 comprises authorization system 210 of FIG. 2. In the example shown, authorization system 400 comprises interface 402. Interface 402 comprises an interface for communicating with external systems using a network. For example, interface 402 comprises an interface for communicating with an authorization service client of a user process, a database read server, an authorization database, a cache system, etc. Processor 404 comprises a processor for executing applications 406. Applications 406 comprise authorization application 408 and other applications 410. For example, authorization application 408 is configured to receive a request from a user of a tenant to enable a connection for a specific internal network application or service to an external network destination, determine whether the connection is enabled for the specific internal network application or service for the tenant, and in response to determining that the connection is enabled, provide a token required for the connection to the external network. Other applications 410 comprises any other appropriate applications (e.g., a communications application, a chat application, a web browser application, a document preparation application, a data storage and retrieval application, a user interface application, a data analysis application, etc.). Authorization system 400 additionally comprises storage 412. Storage 412 comprises authorization list data 414 (e.g., one or more authorization whitelists, one or more authorization blacklists, one or more lists of network applications or services allowed to make external connections or not allowed to make external connections, one or more lists of tenants allowed to make external connections or not allowed to make external connections, etc.) and encryption key data 416 (e.g., encryption key data for signing a token required for the connection to an external network, public key infrastructure encryption key data, etc.). Authorization system 400 additionally comprises memory 418. Memory 418 comprises executing application data 420 comprising data associated with applications 406.

Figure 5:
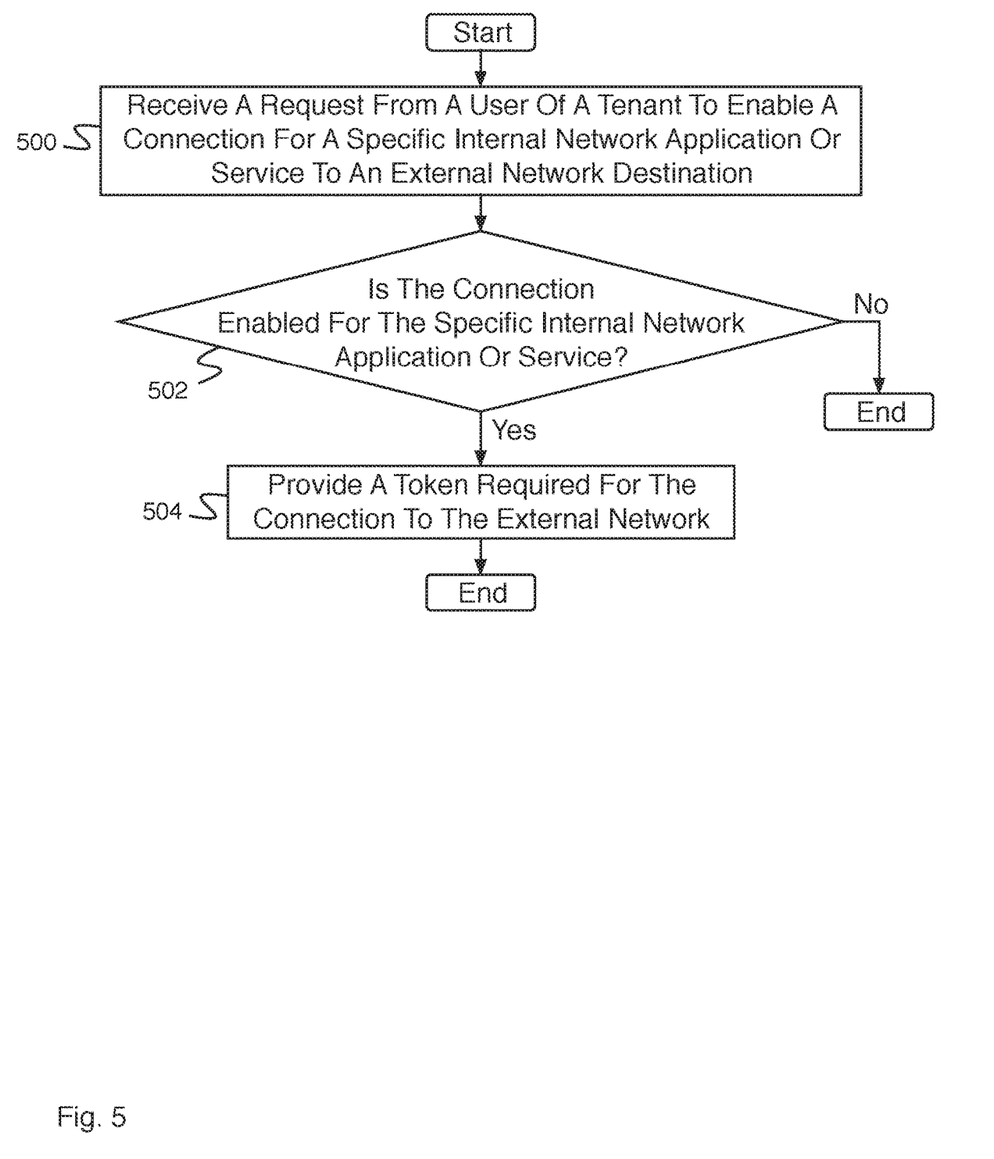
FIG. 5 is a flow diagram illustrating an embodiment of a process for a secure connection.

FIG. 5 is a flow diagram illustrating an embodiment of a process for a secure connection. In some embodiments, the process of FIG. 5 is executed by authorization system 210 of FIG. 2. In the example shown, in 500, a request is received from a user of a tenant to enable a connection for a specific internal network application or service to an external network destination. For example, the internal network application comprises a layer 7 application (e.g., an application utilizing layer 7 of the open systems interconnect model—for example, an application for interaction with a user). In some embodiments, the request comprises a JavaScript Object Notation (JSON) web token structure. For example, the JSON web token comprises a subject, an expiration time, an issuing server identifier, a receiving cluster identifier, a creation time, a secure random unique identifier, or one or more authorization group identifiers. In 502, it is determined whether the connection is enabled for the specific internal network application or service. In various embodiments, the connection comprises a connection for data egress and/or data ingress. In the event it is determined that the connection is not enabled for the specific internal network application or service, the process ends. In the event it is determined that the connection is enabled for the specific internal network application or service, control passes to 504. In 504, a token required for the connection to the external network is provided. In some embodiments, the token comprises a JSON web token structure. For example, the token comprises a subject, an expiration time, an issuing server identifier, a receiving cluster identifier, a creation time, a secure random unique identifier, or one or more authorization group identifiers.

Figure 6:
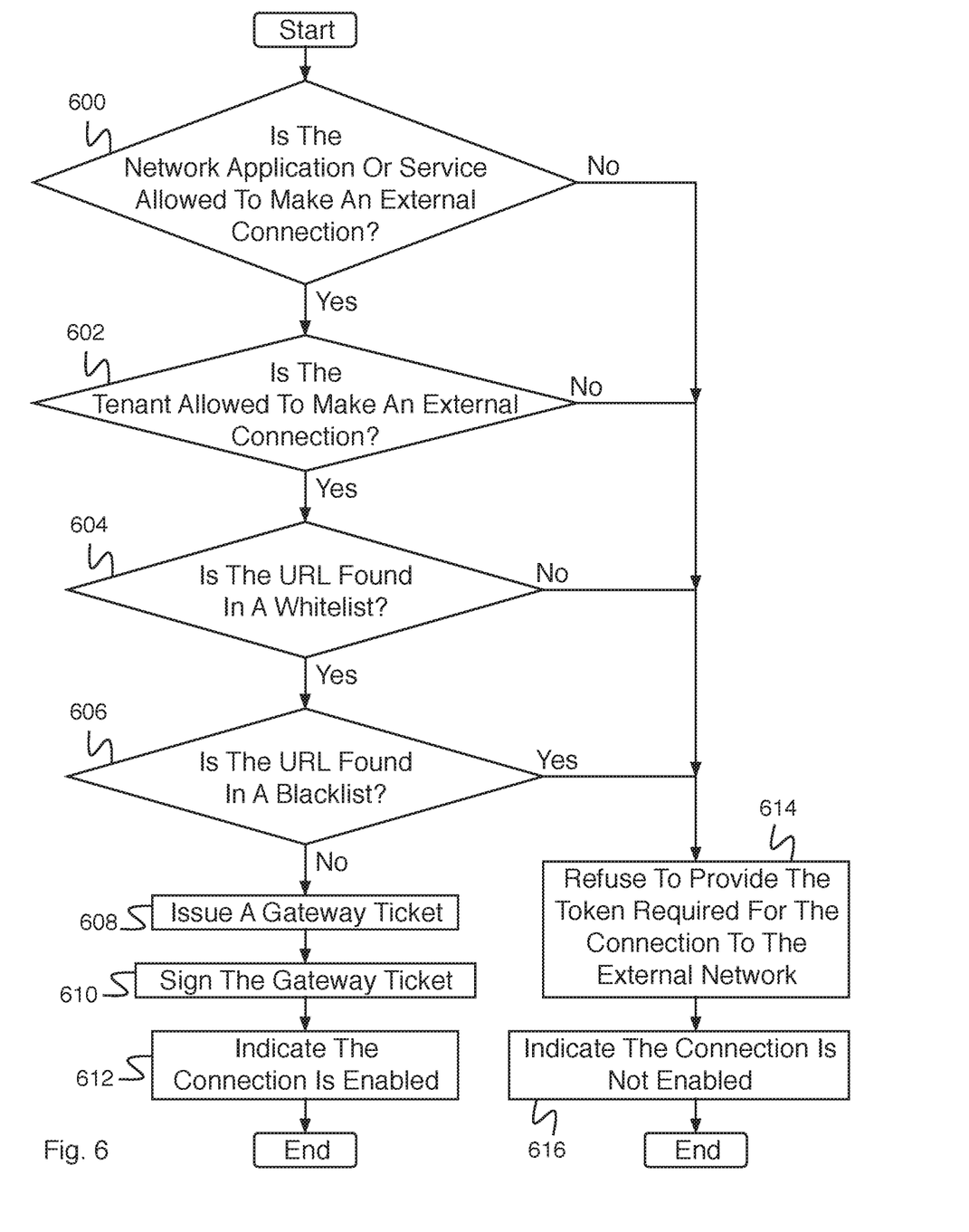
FIG. 6 is a flow diagram illustrating an embodiment of a process for determining whether a connection is enabled for a specific internal network application or service.

FIG. 6 is a block diagram illustrating an embodiment of a process for determining whether a connection is enabled for a specific internal network application or service. In some embodiments, the process of FIG. 6 implements 502 of FIG. 5. In the example shown, in 600, it is determined whether the network application or service is allowed to make an external connection (e.g., using a list of network applications or services allowed to make an external connection). In the event it is determined that the network application or service is not allowed to make an external connection, control passes to 614. In the event it is determined that the network application or service is allowed to make an external connection, control passes to 602. In 602, it is determined whether the tenant is allowed to make an external connection (e.g., using a list of tenants allowed to make an external connection). In the event it is determined that the tenant is not allowed to make an external connection, control passes to 614. In the event it is determined that the tenant is allowed to make an external connection, control passes to 604. In 604, it is determined whether the URL (e.g., the URL associated with the external connection) is found in a whitelist. For example, the whitelist comprises a whitelist associated with a tenant (e.g., a tenant associated with the user requesting the external connection). In some embodiments, the whitelist is configurable by a specific internal network application or service (e.g., a database process for updating the whitelist). In some embodiments, the whitelist is configurable by the tenant (e.g., the tenant configures its own whitelist for external connections). For example, the whitelist is based at least in part on a request domain, a request subdomain, a request path, or request query parameters. In the event it is determined that the URL is not found in a whitelist, control passes to 614. In the event it is determined that the URL is found in a whitelist, control passes to 606. In 606, it is determined whether the URL is found in a blacklist. For example, the blacklist comprises a system-wide blacklist or a blacklist based at least in part on the tenant. In the event it is determined that the URL is found in a blacklist, control passes to 614. In the event it is determined that the URL is not found in a blacklist, control passes to 608. In 608, a gateway ticket is issued. In 610, the gateway ticket is signed (e.g., cryptographically verifying that the gateway ticket is authentic). In 612, the process indicates that the connection is enabled, and the process ends. In 614, the process refuses to provide the token required for the connection to the external network. In 616, the process indicates that the connection is not enabled.

Figure 7:
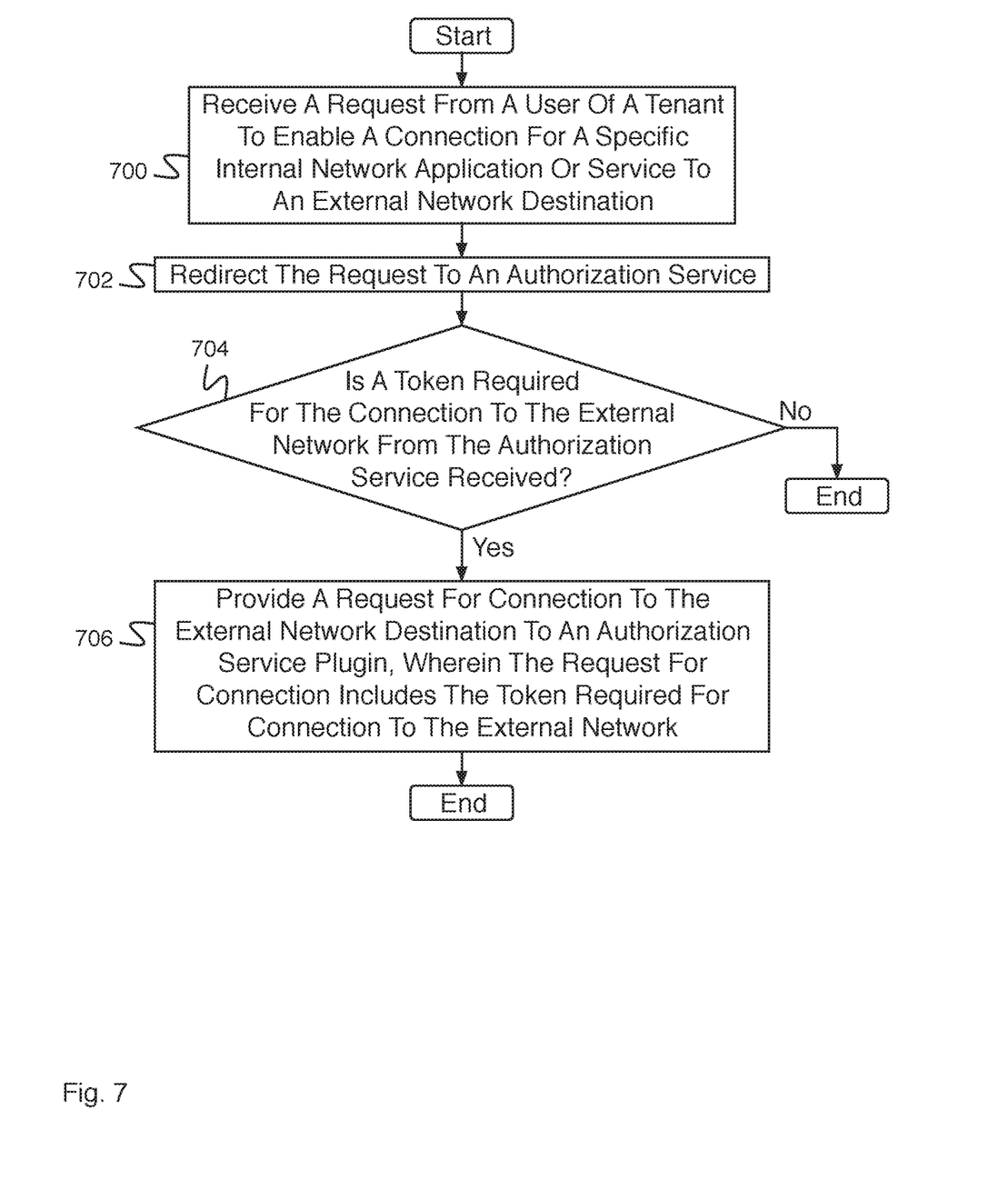
FIG. 7 is a flow diagram illustrating an embodiment of a process for an authorization service client.

FIG. 7 is a flow diagram illustrating an embodiment of a process for an authorization service client. In some embodiments, the process of FIG. 7 is executed by authorization service client 216 of FIG. 2. In the example shown, in 700, a request is received from a user of a tenant to enable a connection for a specific internal network application or service to an external network destination. In 702, the request is redirected to an authorization service. In 704, it is determined whether a token required for the connection to the external network from the authorization service is received. In the event it is determined that the token required for the connection to the external network from the authorization service is not received, the process ends. In the event it is determined that the token required for the connection to the external network from the authorization service is received, control passes to 706. In 706, a request is provided for connection to the external network destination to an authorization service plugin, wherein the request for connection includes the token required for connection to the external network.

Figure 8:
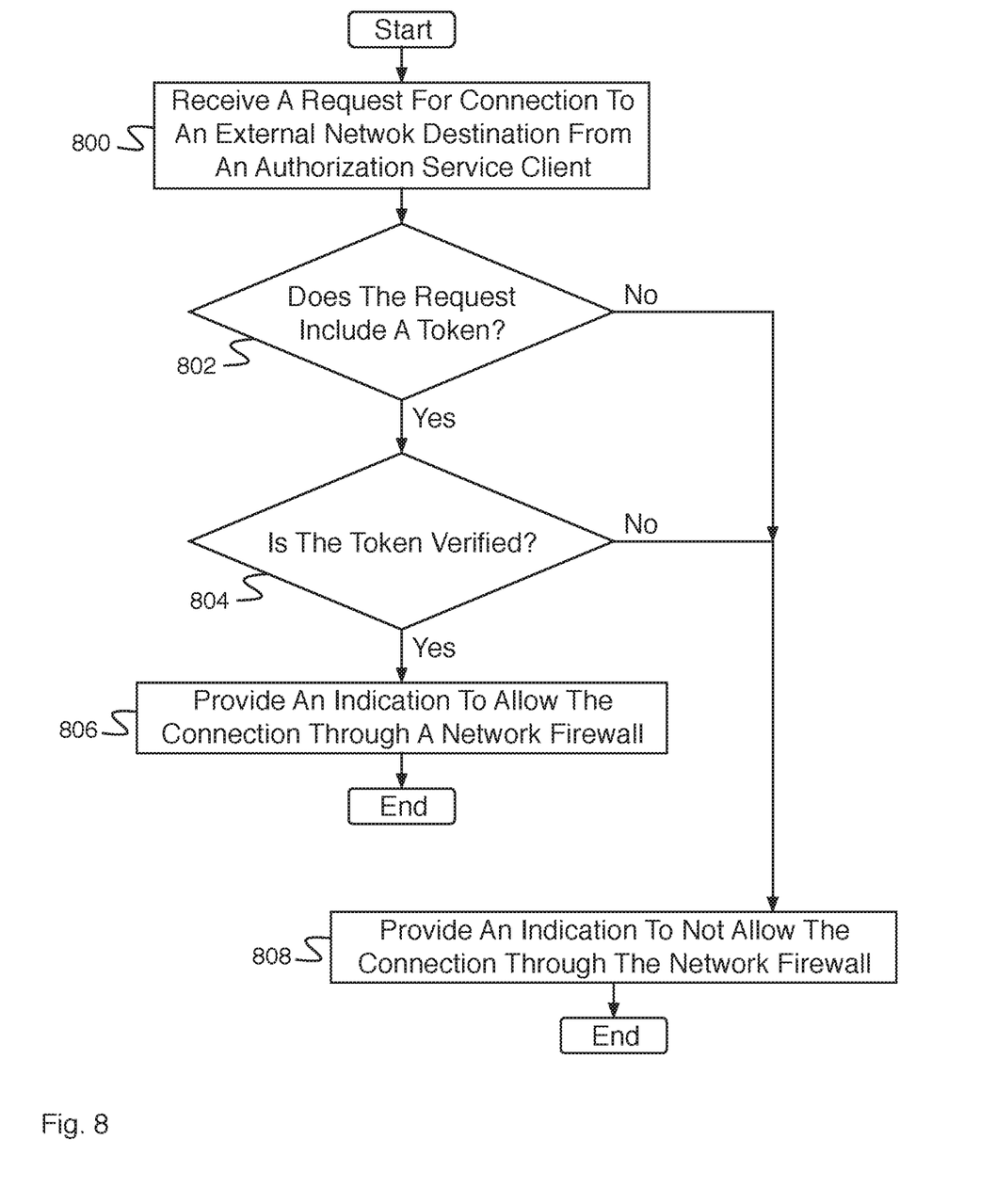
FIG. 8 is a flow diagram illustrating an embodiment of a process for an authorization service plugin.

FIG. 8 is a flow diagram illustrating an embodiment of a process for an authorization service plugin. In some embodiments, the process of FIG. 8 is executed by authorization service plugin 212 of FIG. 2. In the example shown, in 800, a request for connection to an external network destination is received from an authorization service client. In 802, it is determined whether the request includes a token. In the event it is determined that the request does not include a token, control passes to 808. In the event it is determined that the request includes a token, control passes to 804. In 804, it is determined whether the token is verified. For example, it is determined whether the token comprises a cryptographic signature indicating that the token is a valid token. For example, verifying the token comprises verifying data egressing through a firewall. In the event it is determined that the token is not verified, control passes to 808. In the event it is determined that the token is verified, control passes to 806. In 806, an indication is provided to allow the connection through a firewall, and the process ends. In 808, an indication is provided to not allow the connection through the network firewall. For example, the connection through the network firewall comprises a layer 3 connection (e.g., a connection conforming to the layer 3 protocols of the open systems interconnection (OSI) networking model).

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for a secure connection, comprising:
an interface configured to:
receive a request from a user of a tenant to enable a connection for a specific internal network application or service to an external network destination; and
a hardware processor; and
a memory coupled with the processor, wherein the memory is configured to provide the hardware processor with instructions which when executed cause the hardware processor to:
determine whether the connection is enabled for the specific internal network application or service for the tenant; and
in response to determining that the connection is enabled, provide a token required for the connection, comprising to:
select an authorization service plugin of a set of authorization service plugins, wherein each authorization service plugin of the set of authorization service plugins is associated with a firewall system; and
provide the request and the token to the authorization service plugin, wherein the authorization service plugin provides an indication to its associated firewall system to allow the requested connection.

2. The system of claim 1, wherein the internal network application or service comprises a layer 7 application or service.

3. The system of claim 1, wherein the request, the token, or the request and the token comprises a JSON web token structure.

4. The system of claim 3, wherein the request, the token, or the request and the token comprise(s) a subject, an expiration time, an issuing server identifier, a receiving cluster identifier, a creation time, a secure random unique identifier, or one or more authorization group identifiers.

5. The system of claim 1, wherein the connection comprises data egress, data ingress, or data ingress and data egress.

6. The system of claim 1, wherein the processor is further configured to: in response to determining that the connection is not enabled, refuse to provide the token required for the connection to the external network destination.

7. The system of claim 1, wherein determining whether the connection is enabled is based at least in part on a whitelist or a blacklist.

8. The system of claim 7, wherein the whitelist, the blacklist, or the whitelist and the blacklist is based at least in part on the tenant.

9. The system of claim 7, wherein the whitelist, the blacklist, or the whitelist and the blacklist is configurable by the specific internal network application or service.

10. The system of claim 7, wherein the whitelist, the blacklist, or the whitelist and the blacklist is configurable by the tenant.

11. The system of claim 7, wherein the whitelist, the blacklist, or the whitelist and the blacklist is based at least in part on a request domain, a request subdomain, a request path, or request query parameters.

12. The system of claim 7, wherein the blacklist comprises a system-wide blacklist or a blacklist based at least in part on the tenant.

13. The system of claim 7, wherein the whitelist or the blacklist is cached.

14. The system of claim 1, wherein the authorization service plugin is configured to verify data egressing through the associated firewall system.

15. The system of claim 1, wherein the authorization service plugin and the network firewall associated firewall system comprise one of a plurality of plugin firewall pairs, each plugin firewall pair configured to verify data and allow the connection.

16. The system of claim 1, wherein the connection through the associated firewall system comprises a layer 3 connection.

17. The system of claim 1, wherein the processor comprises one of a plurality of processors configured to:
  determine whether the connection is enabled for the specific internal network application or service for the tenant; and
  in response to determining that the connection is enabled, providing the token required for the connection to the external network destination.

18. The system of claim 1, wherein a public key infrastructure is used to ensure internal network security.

19. The system of claim 18, wherein ensuring internal network security comprises enabling only known entities to authorize the token.

20. A method for a secure connection, comprising:
  receiving a request from a user of a tenant to enable a connection for a specific internal network application or service to an external network destination;
  determining, using a processor, whether the connection is enabled for the specific internal network application or service for the tenant; and
  in response to determining that the connection is enabled, providing a token required for the connection, comprising:
  selecting an authorization service plugin of a set of authorization service plugins, wherein each authorization service plugin of the set of authorization service plugins is associated with a firewall system; and
  providing the request and the token to the authorization service plugin, wherein the authorization service plugin provides an indication to its associated firewall system to allow the requested connection.

21. A computer program product for a secure connection, the computer program product being embodied in a non-transitory computer readable storage medium and comprising computer instructions for:
  receiving a request from a user of a tenant to enable a connection for a specific internal network application or service to an external network destination;
  determining whether the connection is enabled for the specific internal network application or service for the tenant; and
  in response to determining that the connection is enabled, providing a token required for the connection, comprising:
  selecting an authorization service plugin of a set of authorization service plugins, wherein each authorization service plugin of the set of authorization service plugins is associated with a firewall system; and
  providing the request and the token to the authorization service plugin, wherein the authorization service plugin provides an indication to its associated firewall system to allow the requested connection.

* * * * *

UNITED STATES PATENT AND TRADEMARK OFFICE
CERTIFICATE OF CORRECTION

PATENT NO. : 11,271,925 B1  
APPLICATION NO. : 16/528604  
DATED : March 8, 2022  
INVENTOR(S) : Kala Krishna Ramineni and Justin Pratt Page 1 of 1

It is certified that error appears in the above-identified patent and that said Letters Patent is hereby corrected as shown below:

In the Claims

In Column 9, Line(s) 38, Claim 15, delete "network firewall".

Signed and Sealed this  
Eighth Day of November, 2022

Katherine Kelly Vidal  
*Director of the United States Patent and Trademark Office*